US009245084B2

(12) United States Patent
Nam et al.

(10) Patent No.: US 9,245,084 B2
(45) Date of Patent: Jan. 26, 2016

(54) VIRTUAL SUB-NET BASED ROUTING

(71) Applicant: International Business Machines Corporation, Armonk, NY (US)

(72) Inventors: Gi-Joon Nam, Austin, TX (US); Sven Peyer, Tuebingen (DE); Ronald D. Rose, Essex Junction, VT (US); Sourav Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/276,436

(22) Filed: May 13, 2014

(65) Prior Publication Data

US 2015/0331987 A1 Nov. 19, 2015

(51) Int. Cl.
*G06F 17/50* (2006.01)

(52) U.S. Cl.
CPC ........ *G06F 17/5077* (2013.01); *G06F 2217/08* (2013.01); *G06F 2217/82* (2013.01); *G06F 2217/84* (2013.01)

(58) Field of Classification Search
CPC .......................... G06F 17/5072; G06F 2217/82
USPC .......................... 716/115, 126, 131
See application file for complete search history.

(56) References Cited

U.S. PATENT DOCUMENTS

| | | | |
|---|---|---|---|
| 6,594,805 B1 * | 7/2003 | Tetelbaum et al. | 716/115 |
| 6,637,014 B2 | 10/2003 | Casavant | |
| 6,907,590 B1 | 6/2005 | Al-Dabagh et al. | |
| 6,996,512 B2 | 2/2006 | Alpert et al. | |
| 7,619,989 B2 * | 11/2009 | Guingo et al. | 370/254 |
| 7,620,922 B1 * | 11/2009 | Wadland et al. | 716/132 |
| 7,657,860 B1 | 2/2010 | Brashears et al. | |
| 8,191,032 B1 * | 5/2012 | Wadland et al. | 716/136 |
| 8,423,940 B2 | 4/2013 | Daellenbach et al. | |
| 8,938,702 B1 * | 1/2015 | Hogan et al. | 716/113 |

OTHER PUBLICATIONS

Fan et al., "Technology Mapping with Crosstalk Noise Avoidance", VLSI Design Automation Lab, Institute of Electronics, 2010, pp. 1-30.
Hua et al., "Pre-route Net Classing for Crosstalk Avoidance", CDN, 2005, pp. 1-8.
Mehdizadeh et al., "A Novel Crosstalk Estimator after Placement", CSICC, 2008, pp. 1-4.
Mehdizadeh et al., "Proposing an Efficient Method to Estimate and Reduce Crosstalk after Placement in VLSI Circuits", IEEE, 2008, pp. 61-68.

(Continued)

*Primary Examiner* — Sun Lin
(74) *Attorney, Agent, or Firm* — Cantor Colburn LLP; Margaret McNamara

(57) ABSTRACT

A method and system to route connections of sub-networks in a design of an integrated circuit and a computer program product are described. The method includes determining a baseline route for each of the connections of each of the sub-networks, identifying noise critical sub-networks in the design of the integrated circuit based on congestion, and setting a mean threshold length (MTL), the MTL indicating a maximum length of each segment of each connection. Each segment includes a wirecode which is different from a wirecode of an adjacent segment, each wirecode defining a width, a metal layer, and a spacing for each segment. The method also includes segmenting the connections of the noise critical sub-networks based on the MTL, and re-routing the baseline route based on the segmenting.

7 Claims, 5 Drawing Sheets

(56) References Cited

OTHER PUBLICATIONS

Milter et al., "Crosstalk Noise Reduction in Synthesized Digital Logic Circuits", IEEE Transactions on Very Large Scale Integration (VLSI) Systems, vol. 11, No. 6, Dec. 2003, pp. 1153-1158.

List of IBM Patents or Patent Applications Treated as Related; (Appendix P), Filed Oct. 1, 2014; 2 pages.

Gi-Joon Nam et al., "Virtual Sub-Net Based Routing", U.S. Appl. No. 14/502,505, filed Sep. 30, 2014.

* cited by examiner

US 9,245,084 B2

VIRTUAL SUB-NET BASED ROUTING

BACKGROUND

The present invention relates to the design of an integrated circuit, and more specifically, to virtual sub-net based routing in integrated circuit design.

As part of the design of an integrated circuit, interconnections among the various sub-networks or sub-nets (groupings of transistors and other components) must be routed. Two considerations in determining the routes are timing and crosstalk. For example, if the routes are too long, timing constraints of the design may not be met. As another example, when routes are temporally aligned, crosstalk may occur such that a signal on one route affects or interferes with a signal on another route. Temporal correlation of interconnects refers to transitions (0 to 1 or 1 to 0) occurring around the same time in close by interconnects.

SUMMARY

According to one embodiment of the present invention, a method of routing connections of sub-networks in a design block of an integrated circuit includes determining a baseline route for each of the connections of each of the sub-networks; identifying, using a processor, noise critical sub-networks in the integrated circuit design based on congestion; setting, using the processor, a mean threshold length (MTL), the (MTL) indicating a maximum length of each segment of each connection, each segment including a different wirecode than an adjacent segment, the wirecode defining a width, metal layer, and spacing for the segment; segmenting the connections of the noise critical sub-networks based on the MTL; and re-routing the baseline route based on the segmenting.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, timing (interconnect delay) and crosstalk are both important considerations in routing the various signals among sub-blocks of an integrated circuit. The likelihood of crosstalk increases as the distance that a signal travels increases and as a number of connections increases. This is because longer interconnects increase the length over which temporal correlation might occur, and higher congestion increases the likelihood that interconnects have to be more closely spaced, thereby increasing the chances of temporal correlations. Embodiments of the systems and methods discussed herein relate to crosstalk aware routing that uses dynamic criteria to virtually segment a long interconnect.

Figure 1:
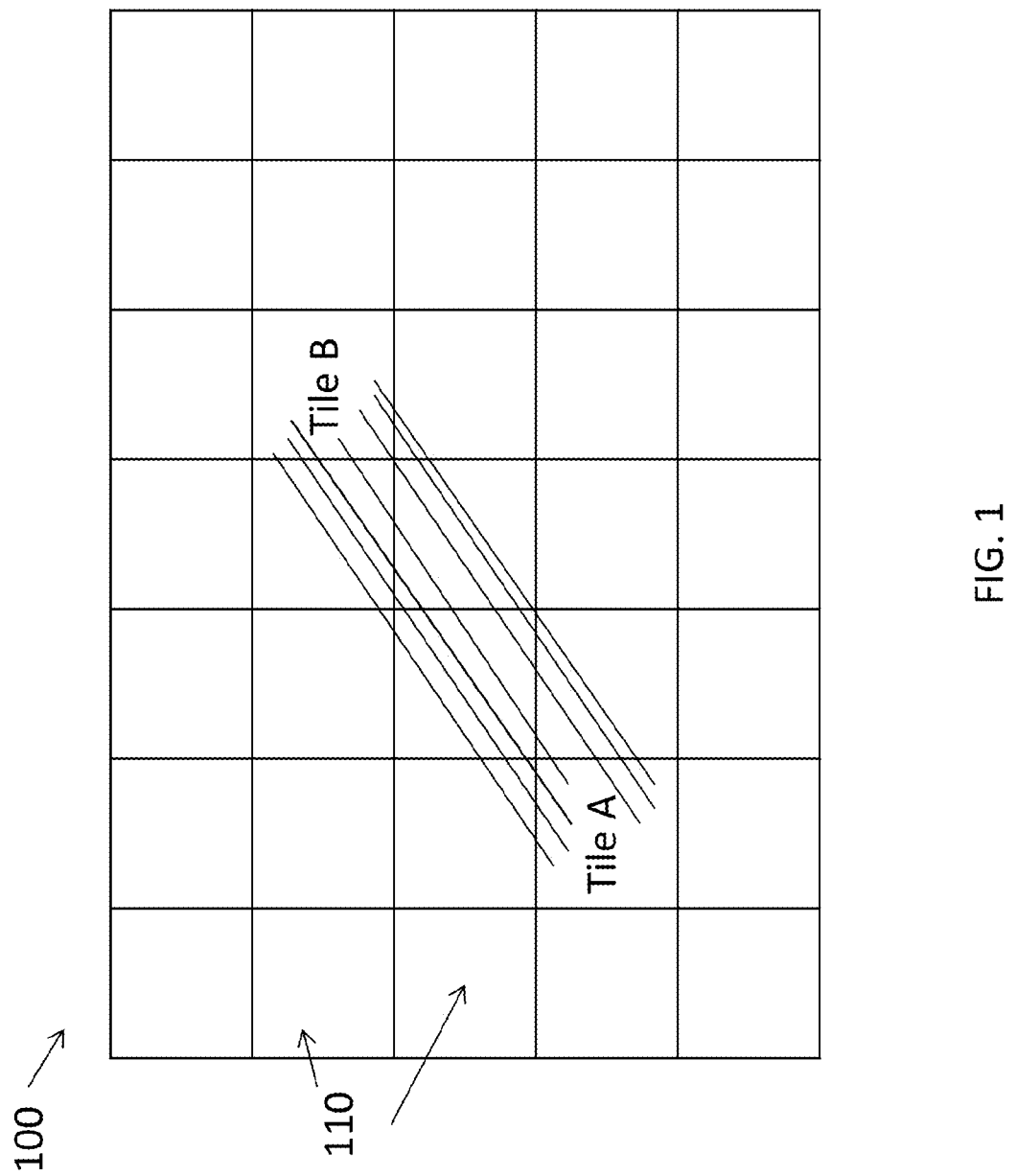
FIG. 1 is an illustration of routing among tiles of a design block of an integrated circuit representation in the design phase.

FIG. 1 is an illustration of routing among tiles 110 of a design block 100 of an integrated circuit representation in the design phase. The computer-aided design (CAD) tool organizes the design block 100 into groupings of components or tiles 110. FIG. 1 illustrates a high routing demand between two exemplary tiles 110 (A and B). The distance and density of communication links between the tiles A and B may result in crosstalk among the connections shown in FIG. 1. Some of the routes shown in FIG. 1 may exceed a threshold Steiner length or maximum coupling length. These routes are susceptible to crosstalk. As detailed below, embodiments of the methods and systems described herein specifically relate to virtually segmenting these routes in the design phase. Long interconnects are routed as smaller segments with different wirecodes (different metal layer, width, spacing, or a combination thereof). Spacing refers to a minimum separation between an interconnect and an adjacent interconnect in the same metal layer.

Figure 2:
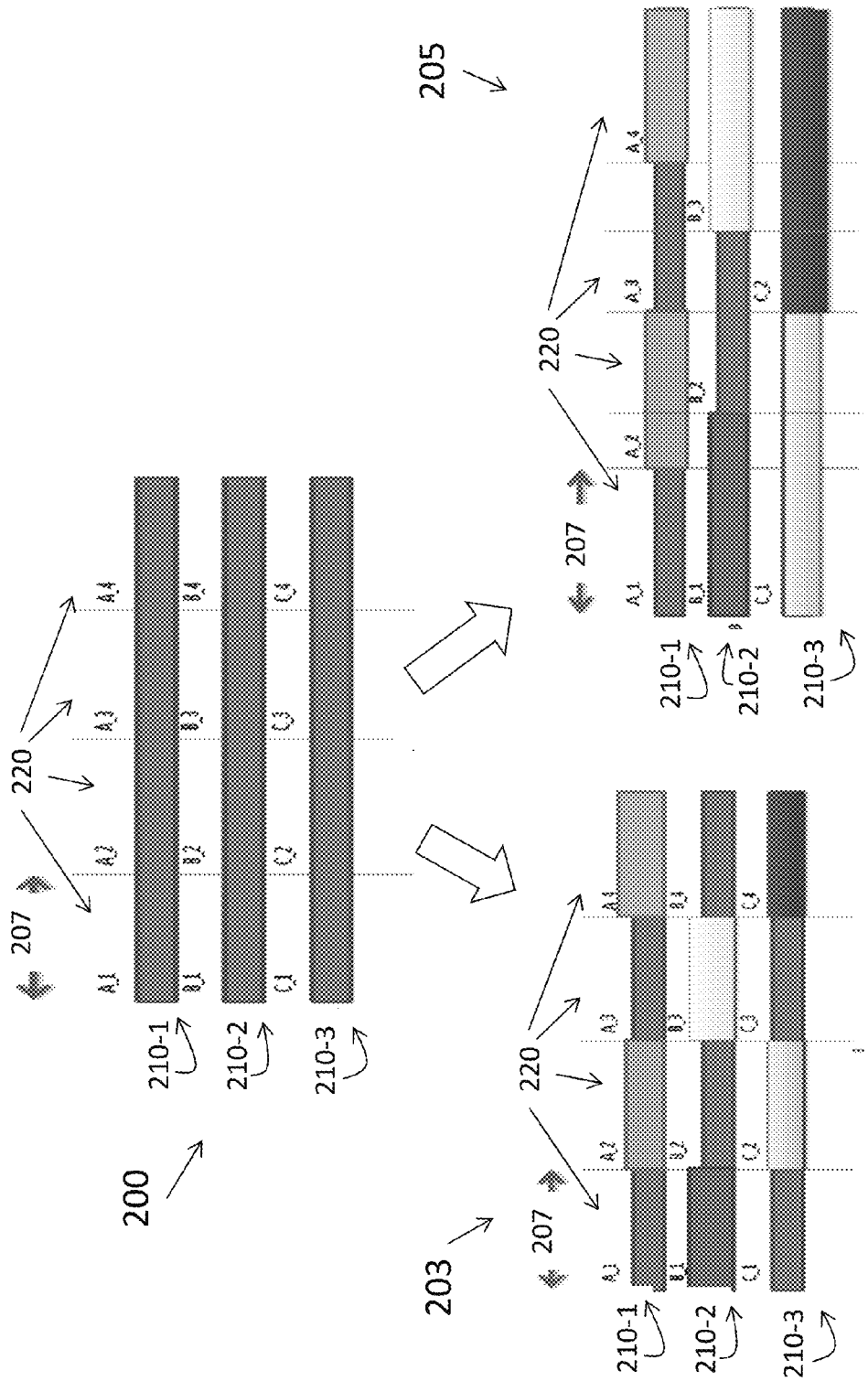
FIG. 2 illustrates symmetric segmentation and asymmetric segmentation according to embodiments of the invention.

FIG. 2 illustrates symmetric segmentation and asymmetric segmentation according to embodiments of the invention. The interconnects 200 include three sub-network connections 210-1, 210-2, 210-3 (referred to generally as connections 210) for explanatory purposes. Each of the connections 210 is shown divided into four segments 220 (connection 210-1 is divided into segments 220 A_1, A_2, A_3, A_4; connection 210-2 is divided into segments 220 B_1, B_2, B_3, B_4; and connection 210-3 is divided into segments 220 C_1, C_2, C_3, C_4), with each segment 220 having an equal length 207. The interconnects 200 may be symmetrically segmented into interconnects 203 or asymmetrically segmented into interconnects 205 according to embodiments of the invention detailed herein. That is, wirecodes are transitioned differently based on the embodiment. According to one embodiment, symmetric segmentation of the interconnects 200 (of the connections 210) results in the interconnects 203. According to this embodiment, each of the connections 210 transitions to a different wirecode (e.g., width as shown in FIG. 2) at the same point or at the end of a segment length 207 as shown in FIG. 2. For example, each of the connections 210 exhibits four different wirecodes over the four segments 220 (a different wirecode within each segment 220 A_1, A_2, A_3, A_4 of connection 210-1, for example). According to another embodiment, asymmetric segmentation of the interconnects 200 results in the interconnects 205. According to this embodiment, each connection 210 transitions to a different wirecode (e.g., width and spacing as shown in FIG. 2) at a different point, as shown in FIG. 2. As shown in FIG. 2, the original segment 220 demarcations of segment length 207 (from interconnects 200) are indicated, but the wirecode transitions of only connection 210-1 in interconnects 205 match up with those demarcations. That is, connection 210-1 exhibits four different wirecodes over the four segments 220. However, connection 210-2 exhibits only three different wirecodes over those four segments 220 such that segment 220 B_4 is not shown for connection 210-2 of interconnects 205. Further, connection 210-3 exhibits two different wirecodes over those four segments 220 such that segments 220 C_3 and C_4 are not shown for connection 210-3 of interconnects 205. None of the connections 210 (of interconnects 205) transition from one wirecode to another at the same point as another connection 210.

Segmenting must be balanced with the timing constraints on the integrated circuit design. That is, while increased segmenting decreases the potential for crosstalk, increased segmenting may also negatively impact timing. The threshold length at which a connection 210 is segmented is inversely dependent on congestion. The higher the congestion (and, thus, the higher the potential for crosstalk), the lower the threshold length for segmentation of the connection 210. Within a tile 110, segment length 207 for multiple connections 210 may be partially randomized around a computed congestion based mean (such that every connection 210 within the interconnects 203, for example, do not have the same segment length 207) to further reduce the potential for crosstalk.

Figure 3:
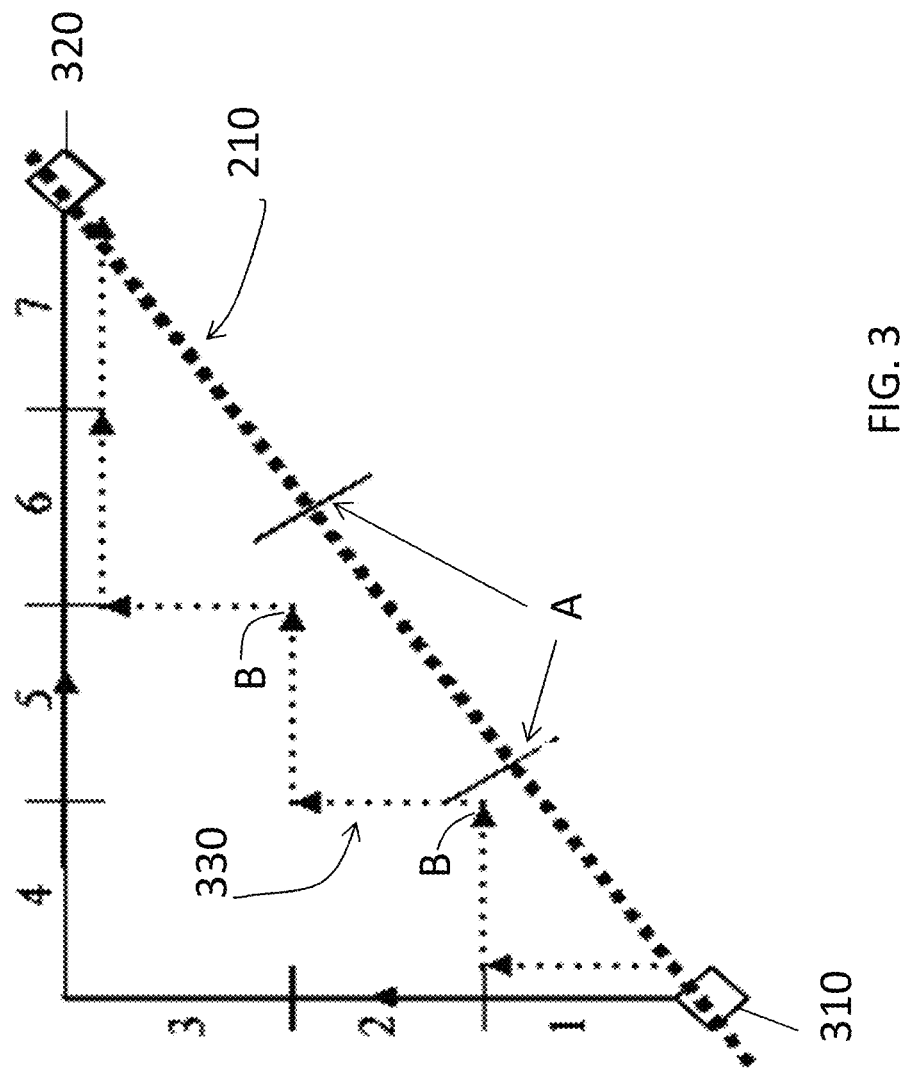
FIG. 3 illustrates different segmenting techniques according to embodiments of the invention.

FIG. 3 illustrates different segmenting techniques according to embodiments of the invention. A source 310 and sink 320 for a connection 210 are shown on a coordinate map of an exemplary sub-network of the integrated circuit. The border or transition point between segments 220 may be marked on the initial connection 210 according to one embodiment, as shown by A. According to another embodiment, the segment 220 transitions may be determined on a Steiner route between the source 310 and sink 320. According to yet another embodiment, a stepped path based on (originating at) the initial connection 210 path and chosen segment length 207 may be used to determine the coordinates (shown by B) at which to jump or transition from one segment to another. In order to prevent timing degradation based on the segmentation, some considerations during the segmenting process include using equivalent or better wirecode within the segments 220 than in the unsegmented connection 210, limiting jogs (keeping the segments as straight as possible), and increasing the overall length of the connection 210. The increase in overall length of the connection 210 is based on maintaining a ratio of the original length to the current length below a specified threshold. The threshold is selected based on timing requirements. That is, the threshold helps maintain the balance of crosstalk reduction efforts through segmentation and meeting timing constraints.

Figure 4:
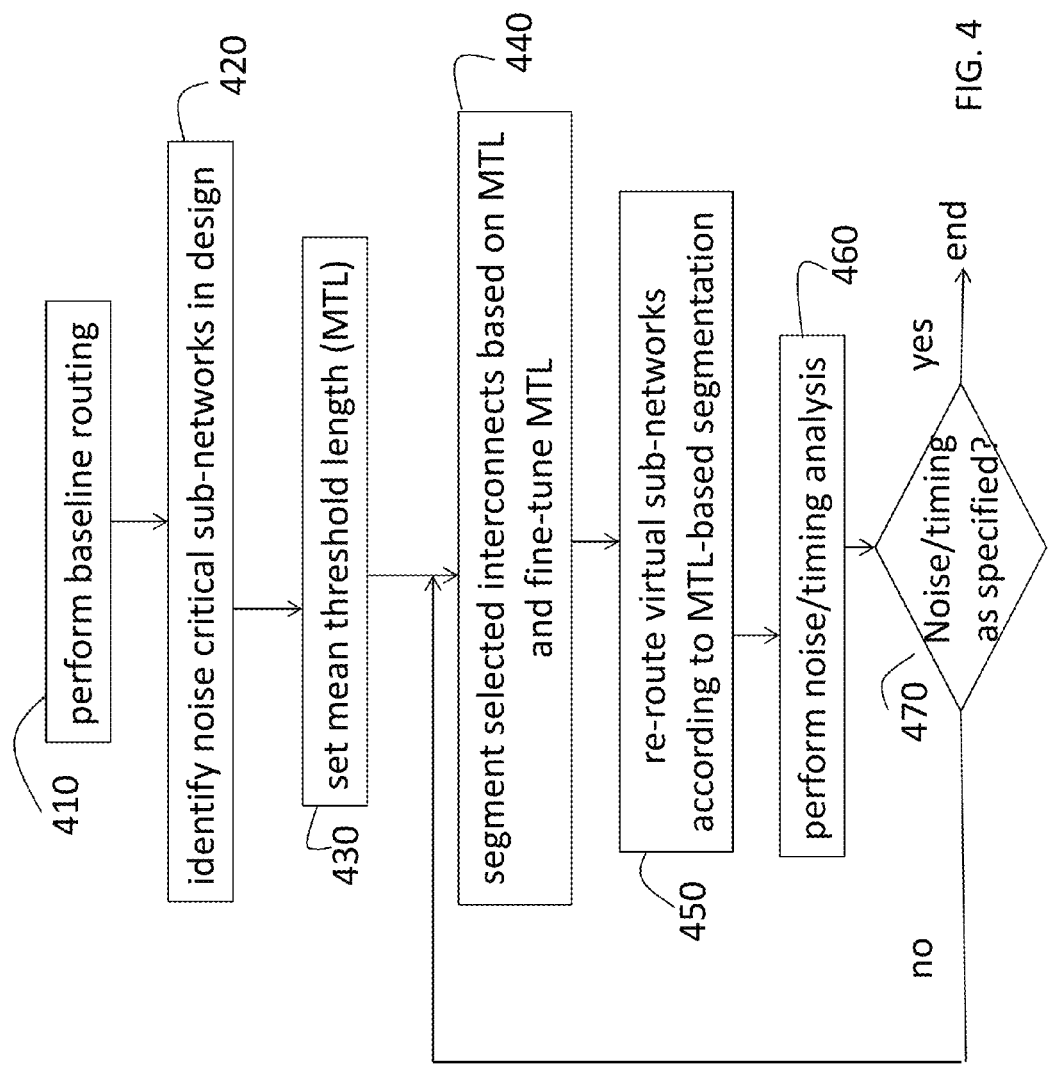
FIG. 4 is a process flow of a method of routing connections in a sub-network to address crosstalk according to embodiments of the invention.

FIG. 4 is a process flow of a method of routing connections 210 in a sub-network to address crosstalk according to embodiments of the invention. At block 410, performing baseline routing provides the initial connections 210 (e.g., interconnects 200 in FIG. 2). Horizontal and vertical congestion may be mapped on a per tile 110 basis. The horizontal and vertical refers to a relative perpendicular orientation of connections 210 rather than to a direction. Identifying noise critical sub-networks in the design at block 420 may include assigning a congestion score to each tile 110. The score may be separate for horizontal and vertical congestion. The score indicates the need for segmenting. As noted above, increased segmentation can negatively affect timing. Thus, segmentation is performed (prioritized) on the basis of need. Crosstalk-aware timing analysis may be performed in addition to identifying noise critical sub-networks. At block 430, setting the mean threshold length (MTL) is done either uniformly or for each sub-network individually. The MTL is the maximum length at which a new segment (a change in wirecode) is warranted based on an increase in susceptibility to crosstalk. The wirecode may be changed after a length that is less than the MTL but must be changed once the length reaches the MTL. The MTL may be based on factors like congestion or utilization and may be determined individually for each sub-network or may be uniform over the integrated circuit design, at least initially. When the MTL is determined per sub-network, a sub-network with more congested interconnections would have a lower MTL (more segmenting), for example. A uniform MTL may be based on an average set of factors (e.g., congestion, utilization) or a worst-case scenario, for example. The MTL may be assigned for virtual sub-networks such that horizontal and vertical orientations are assigned different MTL values for each congestion critical tile 110. The MTL may additionally be determined per wirecode, because each wirecode varies in its susceptibility to crosstalk. Thus, one wirecode may mitigate crosstalk over a longer segment length than another wirecode such that the MTL may be longer for that wirecode. The MTL may also be affected by the technology being supported. That is, for a given process technology, there is a known upper bound of interconnect length at which crosstalk may be maintained within a specified level for a given metal and wirecode. This upper bound may be used as a limiting factor on MTL, while congestion, timing, and other factors further limit MTL. When the MTL is not uniform for every sub-network but is, instead, determined based on the factors discussed above, the routing is said to be design aware.

At block 440, segmenting selected interconnects (e.g., 200) based on MTL includes segmenting long connections 210 that exceed the MTL into segments 220. According to one embodiment discussed above as symmetric segmentation (see e.g., interconnects 203 in FIG. 2), each segment 220 would have a length of MTL. According to another embodiment discussed above as asymmetric segmentation (see e.g., interconnects 205 in FIG. 2), each segment 220 would have a length of MTL$\pm\Delta$, where $\Delta$ is computed based on a random seed or on fine-tuning according to design adaptive randomization. At block 450, the process includes re-routing the virtual sub-networks according to the MTL-based segmentation performed at block 440. At block 460, performing noise and timing analysis for the re-routed virtual sub-networks is followed by determining if noise levels and timing are as specified, at block 470. Specifically, noise voltage level overshoot or undershoot or glitches may cause functional failure, and timing degradation (from the determination at block 420) based on slew fluctuation must not result in failure to adhere to timing constraints. If the noise for the re-routed sub-networks is not below specified levels or timing degradation is not acceptable based on system timing constraints, segmenting selected interconnects at block 440 is repeated. Specifically, the processes at blocks 440-470 are performed iteratively.

Figure 5:
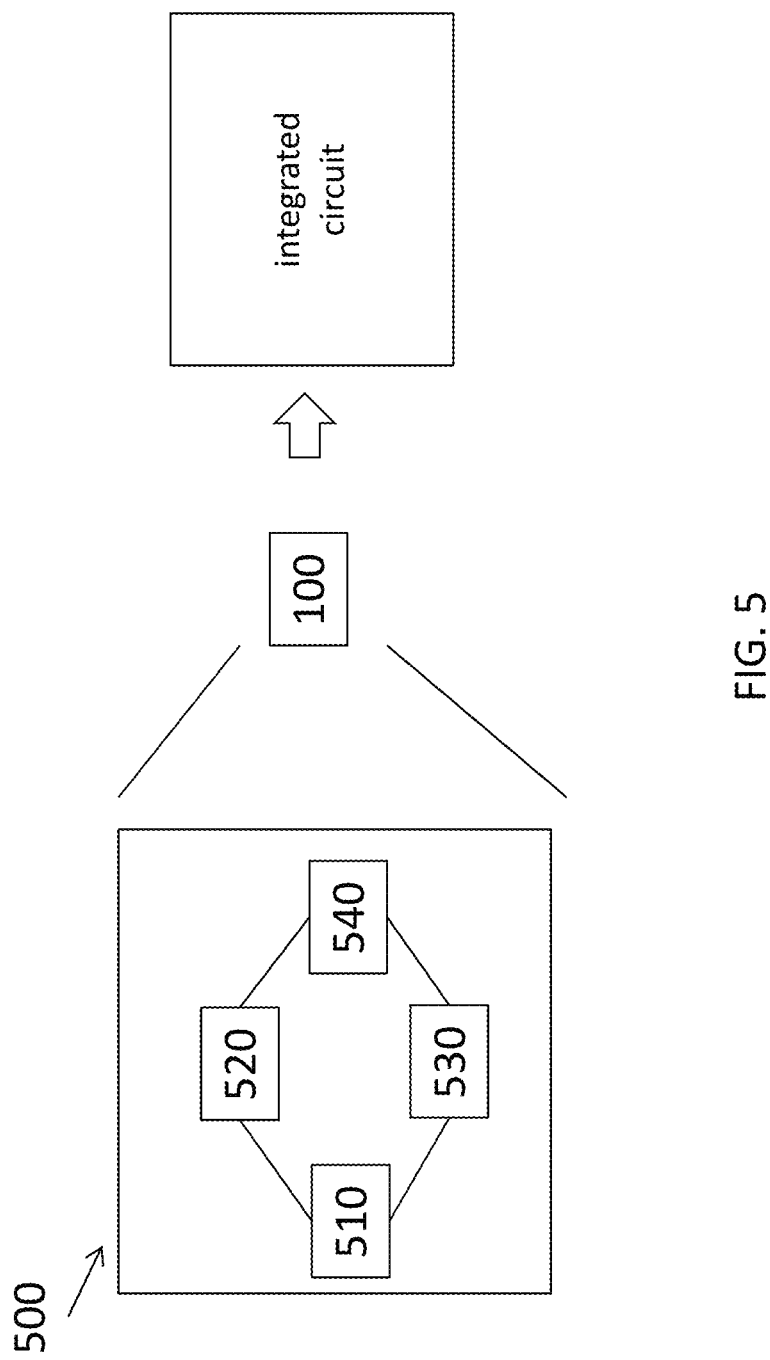
FIG. 5 is a block diagram of a system to generate the design block according to an embodiment of the invention.

FIG. 5 is a block diagram of a system 500 to generate the design block 100 according to an embodiment of the invention. The system 500 executes a CAD tool, for example, to output the design block 100 that is ultimately used to fabricate the integrated circuit. The system 500 includes an input interface 510, one or more processors 520, one or more memory devices 530, and an output interface 540. The CAD tool may be implemented based on instructions stored in the memory device 530 and executed by the processor 520, for example. More than one system 500 may be involved in the generation of the design block 100. The segmented routing for the virtual design that results from the process discussed with reference to FIG. 4 is output as a netlist that is used to fabricate the integrated circuit.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of routing connections of sub-networks in a design of an integrated circuit, the method comprising:
    determining a baseline route for each of the connections of each of the sub-networks;
    identifying, using a processor, noise critical sub-networks in the design of the integrated circuit based on congestion;
    setting, using the processor, a mean threshold length (MTL), the MTL indicating a maximum length of each segment of each connection, each segment including a wirecode which is different from a wirecode of an adjacent segment, each wirecode defining a width, a metal layer, and a spacing for each segment;
    segmenting the connections of the noise critical sub-networks based on the MTL; and
    re-routing the baseline route based on the segmenting.

2. The method according to claim 1, wherein a first sub-network is more noise critical than a second sub-network with a lower congestion.

3. The method according to claim 1, wherein the setting the MTL is done once for all of the sub-networks.

4. The method according to claim 1, wherein the setting the MTL is made design aware (e.g., congestion, timing) and done for each of the sub-networks individually.

5. The method according to claim 1, wherein the segmenting the connections of the noise critical sub-networks includes changing the wirecode of each segment of the connections at every length of MTL.

6. The method according to claim 1, wherein the segmenting the connections of the noise critical sub-networks includes changing the wirecode of each segment of the connections at every length of MTL±Δ, where Δ represents a random variation in each segment length.

7. The method according to claim 1, further comprising performing a noise analysis after the re-routing and repeating the segmenting and the re-routing when the noise analysis indicates that noise levels are above a specified value.

* * * * *